(12) United States Patent
Dmitriev

(10) Patent No.: US 6,912,617 B2
(45) Date of Patent: Jun. 28, 2005

(54) ALTERING VIRTUAL MACHINE EXECUTION PARAMETERS AT RUNTIME

(75) Inventor: Mikhail A. Dmitriev, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 426 days.

(21) Appl. No.: 10/198,578

(22) Filed: Jul. 17, 2002

(65) Prior Publication Data

US 2004/0015647 A1 Jan. 22, 2004

(51) Int. Cl.[7] .............................................. G06F 12/00
(52) U.S. Cl. .................... 711/6; 711/154; 717/130; 717/148; 717/165; 717/166; 718/1; 718/104; 712/228
(58) Field of Search ..................... 711/6, 154; 712/228; 717/130, 148, 165, 166; 718/1, 104

(56) References Cited

U.S. PATENT DOCUMENTS

| | | | | |
|---|---|---|---|---|
| 6,026,237 A | * | 2/2000 | Berry et al. ................ | 717/130 |
| 6,072,953 A | * | 6/2000 | Cohen et al. ................ | 717/166 |
| 6,253,215 B1 | * | 6/2001 | Agesen et al. ............... | 707/206 |
| 6,282,702 B1 | * | 8/2001 | Ungar ......................... | 717/148 |
| 6,463,578 B1 | * | 10/2002 | Johnson ....................... | 717/124 |

OTHER PUBLICATIONS

Iskra et al., "The Implementation of Dynamite–An Environment for Migrating PVM Tasks," ACM SIGOPS Operating Systems Review, vol. 34, Issue 3, pp 40–55, Jul. 2000.*

Milojicic et al., "Process Migration," ACM Computing Surveys, vol. 32, No. 3, pp 241–299, Sep. 2000.*

* cited by examiner

Primary Examiner—Stephen C. Elmore
(74) Attorney, Agent, or Firm—Gunnison, McKay & Hodgson, L.L.P.

(57) ABSTRACT

An existing neutral operating system (OS) signal is utilized to notify a virtual machine (VM) about a change to its execution parameters. The signal is predefined to indicate that an execution parameter should be changed, and upon receipt, the VM may look up a file in a predefined location, the file containing the new command line parameters. The VM may then modify its parameters to match the file, and continue with its execution, thus providing a mechanism for altering VM execution parameters at runtime.

20 Claims, 4 Drawing Sheets

ALTERING VIRTUAL MACHINE EXECUTION PARAMETERS AT RUNTIME

FIELD OF THE INVENTION

The present invention relates to the field of virtual machines. More particularly, the present invention relates to altering virtual machine execution parameters at runtime.

BACKGROUND OF THE INVENTION

A virtual machine (VM) is software that acts as an interface between (normally platform-neutral) code (bytecode) and the hardware that actually executes machine instructions. A Java™ VM created by Sun Microsystems, Inc. of Palo Alto, Calif. is an example of a VM. Modern VMs, at least large ones that run on desktop machines and servers, normally support a lot of execution parameters, specified in the form of command line options. An example of such a VM is the HotSpot™ Java™ VM. These options are read at the VM startup time, and affect the VM behavior during runtime. For example, one may set initial and maximum memory heap size and choose whether to print various types of trace (logging) information.

The value of an execution parameter can be set via a corresponding command line option only once, at the VM startup, and there is no provision for changing its value afterwards. For some execution parameters this does not present a problem, since it is impossible to alter the corresponding setting at runtime (for example, options specifying the dynamic compiler to use, or effectively a dynamic library to load at startup in the HotSpot™ Java™ VM). On the other hand, there are a number of execution parameters for which it would make sense and be technically feasible to change, maybe many times, at runtime. Trace information printing is an example of an option which is usually easy and safe to turn on and off many times during VM execution.

It would make particular sense for system administrators and developers to be able to alter at runtime those VM execution parameters that affect VM serviceability, for example allowing client tools to attach to the running VM and introspect its code and data. This would allow "in the field" debugging and monitoring of applications running on a VM that was not originally configured to support these kinds of activity.

Hence it is desirable to be able to alter at least some of the execution parameters of a VM at runtime.

BRIEF DESCRIPTION OF THE INVENTION

An existing neutral operating system (OS) signal is utilized to notify a virtual machine (VM) about a change to its execution parameters. The signal is predefined to indicate that an execution parameter should be changed, and upon receipt, the VM may look up a file in a predefined location, the file containing the new command line parameters. The VM may then modify its parameters to match the file, and continue with its execution, thus providing a mechanism for altering VM execution parameters at runtime.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
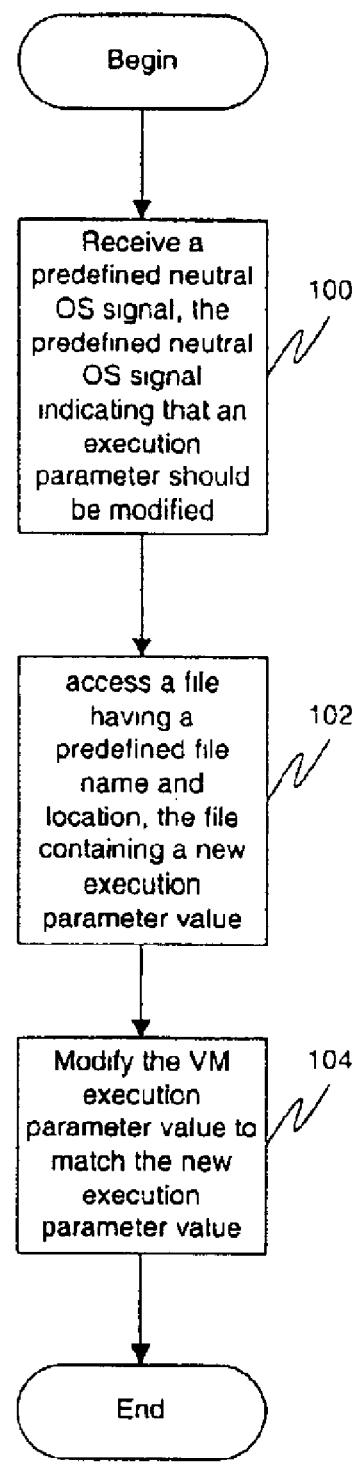
FIG. 1 is a flow diagram illustrating a method for altering a VM execution parameter value at runtime in accordance with a specific embodiment of the present invention.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

A specific embodiment of the present invention may be executed using a Java™ Virtual Machine created by Sun Microsystems, Inc. of Palo Alto, Calif. However one of ordinary skill in the art will recognize that the present invention may be implemented using a variety of different systems and need not be limited to specific examples provided in this document.

In order to support changing some execution parameters at runtime, the virtual machine (VM) should have the capability to listen constantly, waiting for a relevant request to come. It is possible to, for example, modify a VM so that it always listens to some predefined communication port, expecting a command to change its options. However, it is difficult to choose a fixed port number such that nobody else would ever want to use it for a different purpose. Furthermore, if many VMs run on a single computer, it would be required to use as many different port numbers as there are VMs. Additionally, listening to a port is generally unsafe, since by default operating systems do not impose any restrictions as to who can send information to the given port.

In a specific embodiment of the present invention, an existing operating system (OS) signal is utilized to notify a VM about a change to its execution parameters. OS signals are special OS-level events that programs running on the same machine can send to each other. Essentially, they are just numbers. Special mechanisms provided by an OS allow, and in fact enforce, applications to process incoming OS signals asynchronously. That is, a signal is handled immediately after receipt and irrespective of the state of the application.

For example, a user, using a special system utility, can send a "KILL" signal to any application to terminate it immediately. However, unlike the "KILL" signals there are a number of OS signals that do not force a running application to handle it in a special way. It should be noted that for purposes of the definition of these OS signals, the VM described herein should not be considered to be one of the running applications, even if it is running. These OS signals may be referred to as neutral OS signals. Examples of these signals include the SIGUSR1 and SIGUSR2 user defined signals in UNIX.

In a specific embodiment of the present invention, one of these neutral OS signals is set aside to support the changing of execution parameters of a VM at runtime. The VM may then react to receiving this particular signal by going to some predefined file system directory (for example, the directory from which this VM was started) and looking up a file with some predefined name in this directory. The file, if it exists, may contain the new command line options in the typical text format. The VM may then read and parse the file, and alter its execution parameters corresponding to the specified command line options. It then may continue operating.

FIG. 1 is a flow diagram illustrating a method for altering a VM parameter value at runtime in accordance with a specific embodiment of the present invention. At 100, a predefined neutral OS signal may be received, the predefined neutral OS signal indicating that an execution parameter should be modified. Then, at 102, a file having a predefined file name and location may be accessed, the file containing a new execution parameter value. The parameter values in this file may be specified in the form of command line options, in the same form as those that the VM reads and processes at startup. The file may be located in a predefined file directory. At 104, the VM execution parameter value may be modified to match the new execution parameter value.

In a specific embodiment of the present invention, a special security feature may be added. In order to protect a VM from malicious use of the described mechanism, the directory from which the VM reads the new options file may be write protected. This prevents unauthorized users from placing a file with new execution parameters into this directory. A dedicated OS signal can still be sent to the VM by any user, however if the VM does not find an options file in the predefined directory, it doesn't change any of its execution parameters.

Figure 2:
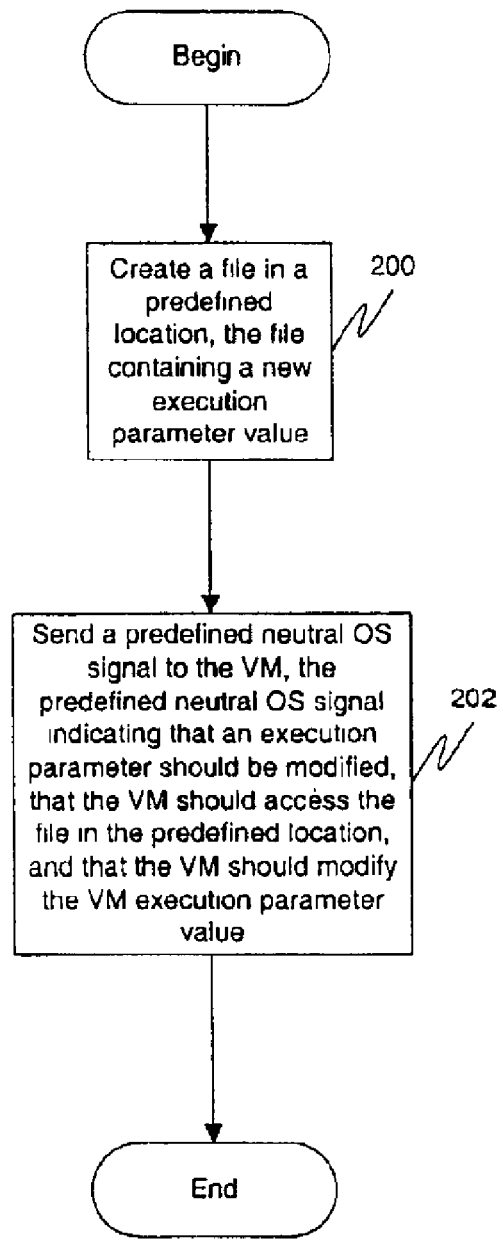
FIG. 2 is a flow diagram illustrating a method for causing the alteration of a VM execution parameter value at runtime in accordance with a specific embodiment of the present invention.

FIG. 2 is a flow diagram illustrating a method for causing the alteration of a VM execution parameter value at runtime in accordance with a specific embodiment of the present invention. At 200, a file may be created in a predefined location, the file containing a new execution parameter value. The parameter values in this file may be specified in the form of command line options, in the same form as those that the VM reads and processes at startup. The file may be located in a predefined file directory which may be write protected for added security. At 202, a predefined neutral OS signal may be sent to the VM, the predefined neutral OS signal indicating that an execution parameter should be modified, that the VM should access the file in the predefined location, and that the VM should modify the VM execution parameter value.

Figure 3:
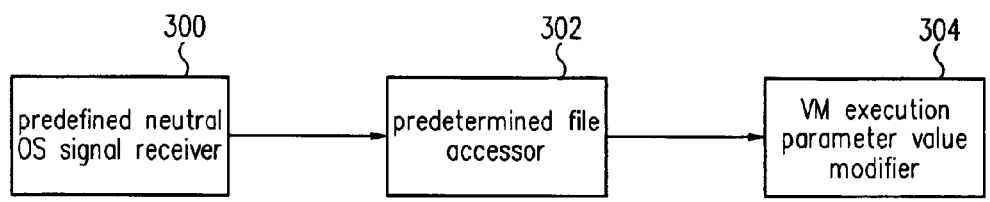
FIG. 3 is a block diagram illustrating an apparatus for altering a VM execution parameter value at runtime in accordance with a specific embodiment of the present invention.

FIG. 3 is a block diagram illustrating an apparatus for altering a VM parameter value at runtime in accordance with a specific embodiment of the present invention. A predefined neutral OS signal receiver 300 may receive a predefined neutral OS signal, the predefined neutral OS signal indicating that an execution parameter should be modified. A predetermined file accessor 302 coupled to the predefined neutral OS signal receiver may access a file having a predefined file name and location, the file containing a new execution parameter value. The parameter values in this file may be specified in the form of command line options, in the same form as those that the VM reads and processes at startup. The file may be located in a predefined file directory. A VM execution parameter value modifier 304 coupled to the predetermined file accessor 302 may modify the VM execution parameter value to match the new execution parameter value.

In a specific embodiment of the present invention, a special security feature may be added. In order to protect a VM from malicious use of the described mechanism, the directory from which the VM reads the new options file may be write protected. This prevents unauthorized users from placing a file with new execution parameters into this directory. A dedicated OS signal can still be sent to the VM by any user, however if the VM does not find an options file in the predefined directory, it doesn't change any of its execution parameters.

Figure 4:
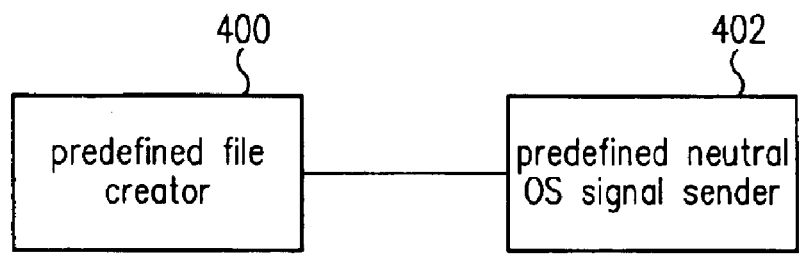
FIG. 4 is a block diagram illustrating an apparatus for causing the alteration of a VM execution parameter value at runtime in accordance with a specific embodiment of the present invention.

FIG. 4 is a block diagram illustrating an apparatus for causing the alteration of a VM execution parameter value at runtime in accordance with a specific embodiment of the present invention. A predefined file creator 400 may create a file in a predefined location, the file containing a new execution parameter value. The parameter values in this file may be specified in the form of command line options, in the same form as those that the VM reads and processes at startup. The file may be located in a predefined file directory which may be write protected for added security. A predefined neutral OS signal sender 402 coupled to the predefined file creator 400 may send a predefined neutral OS signal to the VM, the predefined neutral OS signal indicating that an execution parameter should be modified, that the VM should access the file in the predefined location, and that the VM should modify the VM execution parameter value.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for altering a virtual machine (VM) execution parameter value at runtime, comprising:

receiving a predefined neutral operating system (OS) signal, said predefined neutral OS signal indicating that an execution parameter should be modified;

accessing a file having a predefined file name and location, said file containing a new execution parameter value; and modifying the VM execution parameter value to match said new execution parameter value.

2. The method of claim 1, wherein said VM execution parameter value is a VM execution command line parameter value.

3. The method of claim 2, wherein said new execution parameter value is a new command line option.

4. The method of claim 1, wherein said predefined location for said file is a predefined file system directory.

5. The method of claim 4, wherein said predefined file system directory is write protected.

6. A method for causing alteration of a Virtual Machine (VM) execution parameter value at runtime, comprising:

creating a file containing a new execution parameter value in a predefined location; and sending a predefined neutral Operating System (OS) signal to the VM, said predefined neutral OS signal indicating that an execution parameter should be modified and that the VM should access said file in said predefined location.

7. The method of claim 6, wherein said VM execution parameter value is a VM execution command line parameter value.

8. The method of claim 7, wherein said new execution parameter value is a new command line option.

9. The method of claim 8, wherein said predefined file system directory is write protected.

10. The method of claim 6, wherein said predefined location for said file is a predefined file system directory.

11. An apparatus for altering a virtual machine (VM) execution parameter value at runtime, comprising:

means for receiving a predefined neutral operating system (OS) signal, said predefined neutral OS signal indicating that an execution parameter should be modified;

means for accessing a file having a predefined file name and location, said file containing a new execution parameter value; and means for modifying the VM execution parameter value to match said new execution parameter value.

12. The apparatus of claim 11, wherein said VM execution parameter value is a VM execution command line parameter value.

13. The apparatus of claim 12, wherein said new execution parameter value is a new command line option.

14. The apparatus of claim 11, wherein said predefined location for said file is a predefined file system directory.

15. The apparatus of claim 14, wherein said predefined file system directory is write protected.

16. An apparatus for causing alteration of a Virtual Machine (VM) execution parameter value at runtime, comprising:

means for creating a file in a predefined location containing a new execution parameter value; and means for sending a predefined neutral OS signal to the VM, said predefined neutral Operating System (OS) signal indicating that an execution parameter should be modified, that the VM should access said file in said predefined location, and that the VM should modify the VM execution parameter value.

17. The apparatus of claim 16, wherein said VM execution parameter value is a VM execution command line parameter value.

18. The apparatus of claim 17, wherein said new execution parameter value is a new command line option.

19. The apparatus of claim 16, wherein said predefined location for said file is a predefined file system directory.

20. The apparatus of claim 19, wherein said predefined file system directory is write protected.

* * * * *